US008830305B2

(12) United States Patent
Huang

(10) Patent No.: US 8,830,305 B2
(45) Date of Patent: Sep. 9, 2014

(54) LIQUID CRYSTAL DISPLAYER AND CONTROL METHOD THEREOF

(75) Inventor: Wei-Heng Huang, Taipei County (TW)

(73) Assignee: Acer Incorporated, New Taipei (TW)

( * ) Notice: Subject to any disclaimer, the term of this patent is extended or adjusted under 35 U.S.C. 154(b) by 1167 days.

(21) Appl. No.: 12/770,719

(22) Filed: Apr. 30, 2010

(65) Prior Publication Data

US 2011/0221870 A1   Sep. 15, 2011

(30) Foreign Application Priority Data

Mar. 12, 2010  (TW) .............................. 99107391 A

(51) Int. Cl.
*H04N 13/04* (2006.01)

(52) U.S. Cl.
CPC ....... *H04N 13/0497* (2013.01); *H04N 13/0434* (2013.01)
USPC .......................................................... 348/51

(58) Field of Classification Search
USPC .......................................................... 348/51
See application file for complete search history.

(56) References Cited

U.S. PATENT DOCUMENTS

| 8,111,229 | B2 * | 2/2012 | Song et al. ....................... 345/96 |
| 2007/0247477 | A1 | 10/2007 | Lowry et al. |
| 2008/0012814 | A1 | 1/2008 | Kim |
| 2008/0042924 | A1 | 2/2008 | Lee et al. |
| 2009/0001944 | A1 * | 1/2009 | Kim et al. ..................... 323/238 |
| 2009/0091815 | A1 * | 4/2009 | Shiu et al. ..................... 359/245 |

FOREIGN PATENT DOCUMENTS

TW       200820164      5/2008

OTHER PUBLICATIONS

"Office Action of Taiwan counterpart application" issued on Apr. 16, 2013, p. 1-p. 9.

* cited by examiner

*Primary Examiner* — Nhon Diep
(74) *Attorney, Agent, or Firm* — Jianq Chyun IP Office

(57) ABSTRACT

A liquid crystal displayer and control method thereof are disclosed. The liquid crystal displayer capable of displaying image in a three dimensional mode comprises a display panel, a first timing controller, a second timing controller and a control module. The first timing controller and the second timing controller are electrically coupled to the display panel. While receiving multiple frames, the control module controls the first timing controller according to a refresh frequency of the frames, to feed the frames to the panel based on a frame clock, and controls the second timing controller to invert the signal polarity of the frames based on an inversion clock.

6 Claims, 6 Drawing Sheets

LIQUID CRYSTAL DISPLAYER AND CONTROL METHOD THEREOF

TECHNICAL FIELD

The present invention relates generally to a liquid crystal displayer and control method thereof, more particularly, related to a liquid crystal displayer capable of displaying image in two dimensional mode, and in three dimensional mode fro a shutter glass.

BACKGROUND

Image-sticking phenomenon is one of the most important issues affecting LCDs, especially LCD TV. It is known that image sticking is caused by residual DC voltage. A polarity inversion scheme is applied in panel driver, for example, frame inversion scheme, row inversion scheme, column inversion scheme, dot inversion, and line inversion scheme.

Generally, the refresh frequency of the 3D liquid crystal displayer with shutter glasses must exceed 120 Hz for displaying right-eye images and left-eye image interlacedly in three-dimensional mode. However, while the image is displayed on the 3D liquid crystal displayer in the three-dimensional mode and the conventional polarity inversion scheme is applied, a residual DC voltage is generated due to different data voltage between the right-eye image and the left-eye image, as shown in FIG. 1. The residual DC voltage causes motion blur and glitter after the 3D liquid crystal displayer is switched from three-dimensional mode to two-dimensional mode.

SUMMARY OF THE INVENTION

Therefore, an object of the present invention is to provide a liquid crystal displayer and control method thereof, so as to solve the motion blur and residual DC voltage caused by the switch between a two-dimensional mode and a three-dimensional mode.

The object of the present invention can be achieved by providing a liquid crystal displayer capable of displaying image in a three dimensional mode. The liquid crystal displayer comprises a display panel, a first timing controller, a second timing controller and a control module. The first timing controller and the second timing controller are electrically coupled to the display panel. While receiving multiple frames, the control module controls the first timing controller according to a refresh frequency of the frames, to feed the frames to the panel based on a frame clock, and controls the second timing controller to invert the signal polarity of the frames based on an inversion clock.

The object of the present invention can be achieved by providing a liquid crystal displayer capable of displaying image in a two dimensional mode, or in a three dimensional mode for a shutter glass. The liquid crystal displayer comprises multiple pixel units, a gate driver, a source driver, a first timing controller and a second timing controller and a control module. Each pixel units comprises a thin film transistor, a first capacitor and a second capacitor which are connected in parallel with a drain of the thin film transistor. The gate driver is coupled electrically to the drains of the thin film transistors, and provides multiple gate voltages. The source driver is coupled electrically to the sources of the thin film transistors and provides multiple data voltages. The first timing controller and the second timing controller are coupled electrically to the source driver. The control module coupled electrically to the gate driver, the first timing controller and the second timing controller. While receiving multiple frames, the he control module according to a refresh frequency of the frames the control module, controls the gate driver to input the gate voltages and controls the first timing controller to input the data voltages which correspond to the frames, to the pixel units according to a frame clock. The control module controls the second timing controller to invert the signal polarity of the frames based on an inversion clock. The period of the inversion clock is N times of the period of the frame clock, and N is a positive integer larger than 1.

The object of the present invention can be achieved by providing a liquid crystal displayer control method for controlling a liquid crystal displayer to display an image in two-dimensional mode, or in a three-dimensional mode for a shutter glass. The liquid crystal displayer control method comprises steps of receiving multiple frames and detecting a refresh frequency of the frames; inputting the frames into the displayer according to a frame clock; inverting the signal polarity of the frames according to an inversion clock. The period of the inversion clock is N times of the period of the frame clock, and N is a positive integer larger than 1.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
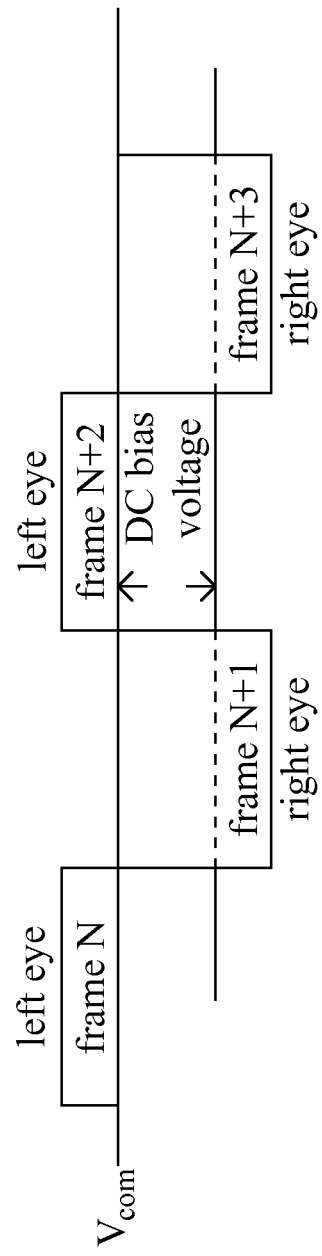
FIG. 1 illustrates a charge/discharge curve of 3D liquid crystal displayer in prior art.
Figure 2:
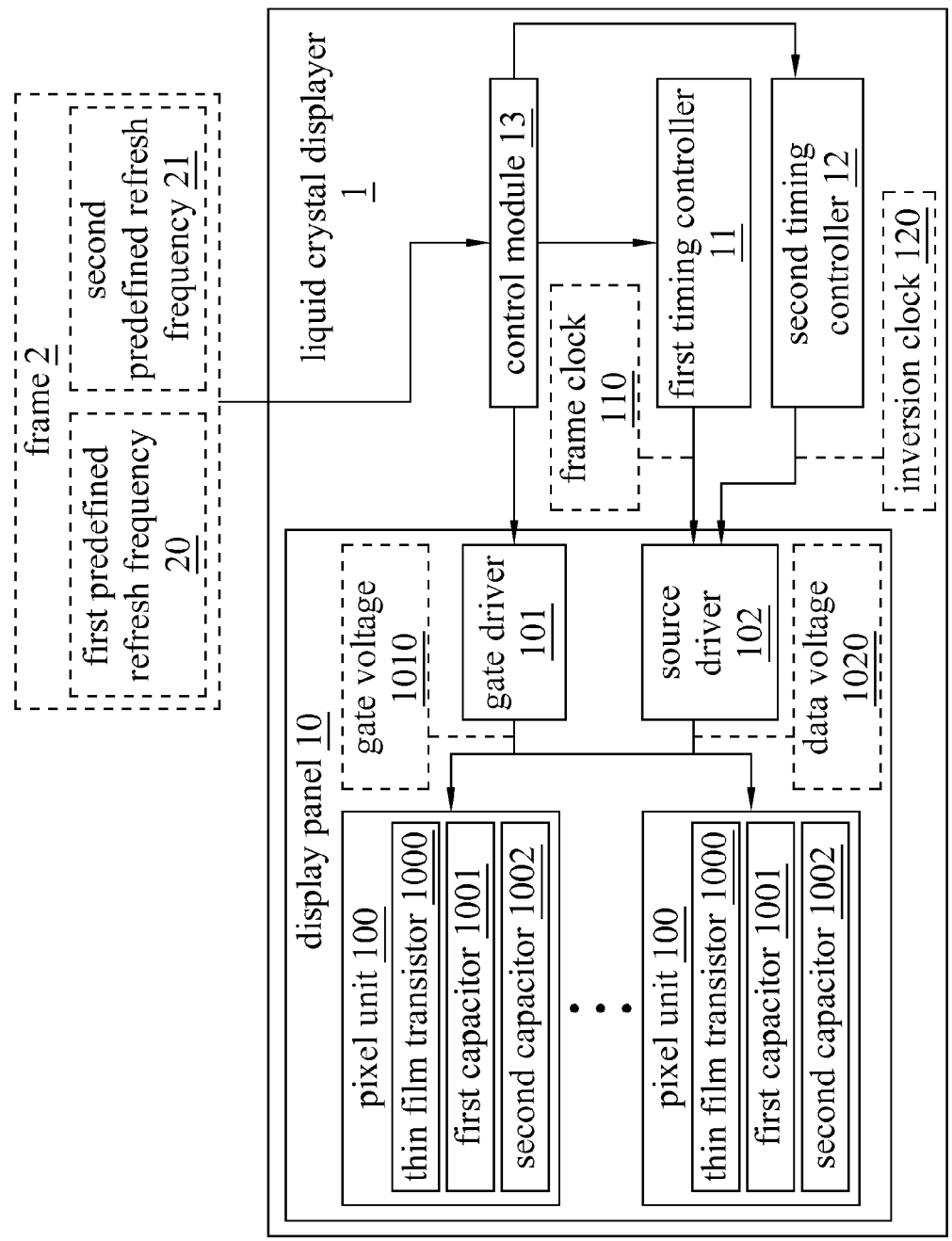
FIG. 2 illustrates block diagram of a liquid crystal displayer in accordance with the present invention.

FIG. 2 illustrates block diagram of a liquid crystal displayer in accordance with the present invention. The liquid crystal displayer 1 comprises a display panel 10, a first timing controller 11, a second timing controller 12 and a control module 13. The display panel 10 further comprises multiple pixel units 100, a gate driver 101 and a source driver 102. The first timing controller 11 and the second timing controller 12 are electrically coupled to the display panel 10 for display control. The control module 13 is electrically coupled to the first timing controller 11 and the second timing controller 12. While receiving multiple frames 2, the control module 13 controls the first timing controller 11 according to a refresh frequency of the frames 2, to input the frames 2 to the display panel 10 based on a frame clock 110, and controls the second timing controller 12 to invert the signal polarity of the frames 2 based on an inversion clock 120. The period of the inversion clock is N times of the period of the frame clock, and N is a positive integer larger than 1. Preferably, the operation control module 13 is depended on the comparison of the refresh frequency of the frames 2 between a first predefined refresh frequency and a second predefined refresh frequency.

The first predefined refresh frequency 20 is lower than a second predefined refresh frequency 21. While receiving the frame 2 with a first predefined refresh frequency 20, the control module 13 controls the second timing controller 12 to set the period of the frame clock 110 as the period of inversion clock 120, and to invert the signal polarity of the frame 2 with first refresh frequency 20. While receiving the frame 2 with a second predefined refresh frequency 21, the control module 13 controls the second timing controller 12 to set N times of the period of the frame clock 110 as the period of inversion clock 120, and to invert the signal polarity of the frame 2 with second refresh frequency 20. N is a positive integer larger than 1.

Figure 3:
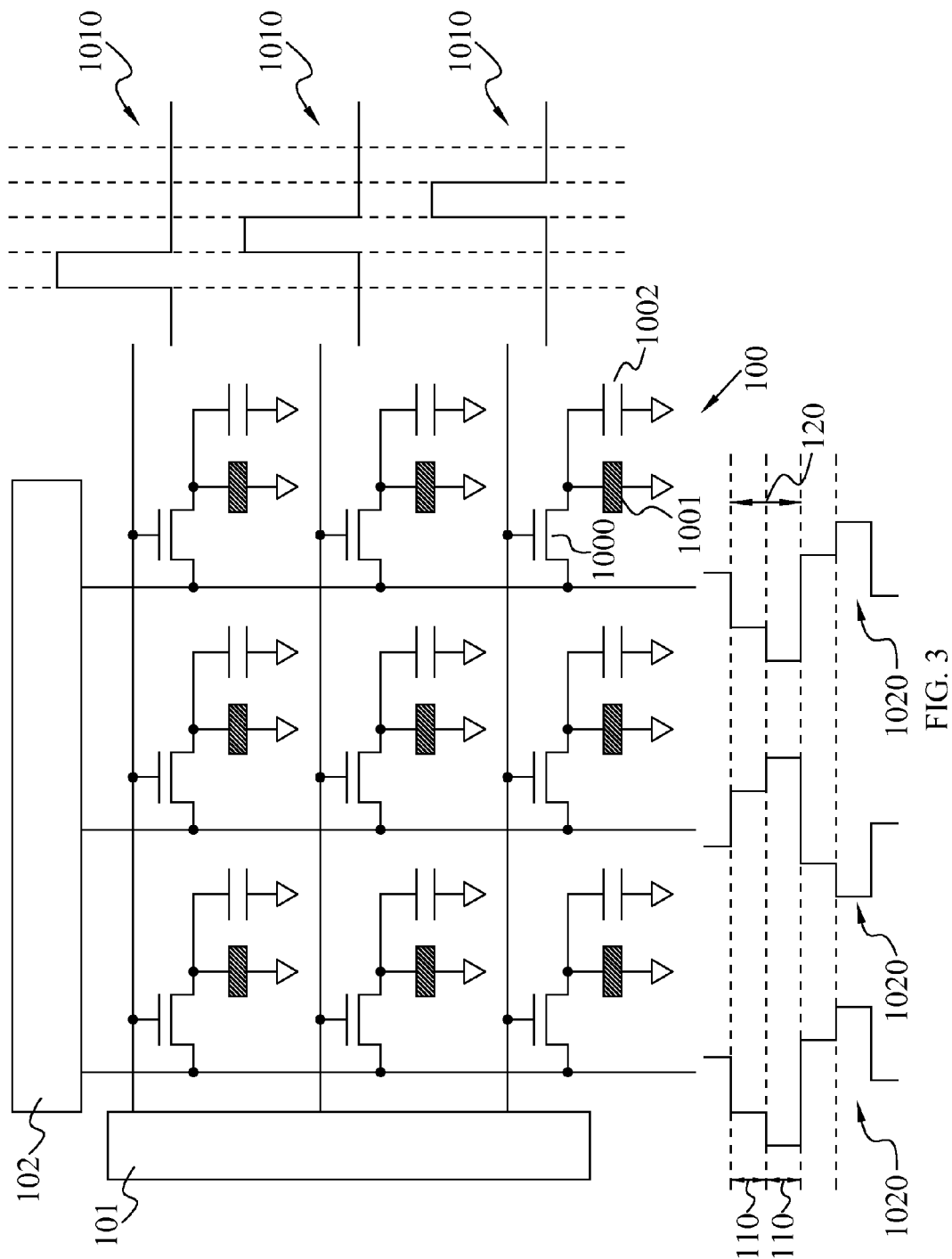
FIG. 3 illustrates an exemplary circuit of a liquid crystal displayer in accordance with the present invention.

FIG. 3 illustrates an exemplary circuit of a liquid crystal displayer in accordance with the present invention. This exemplary circuit is an Equivalent circuit of display panel 10 of the liquid crystal displayer 1. Each pixel unit represents a display unit, and comprises a thin film transistor 1000, a capacitor 1001 for liquid crystal and a capacitor 1002 for voltage storage. The capacitor 1001 and capacitor 1002 are connected in parallel with a drain of the thin film transistor 1000. The gate driver 101 is coupled electrically to drains of thin film transistors 1000, and provides multiple gate voltages 1010. The source driver 102 is coupled electrically to sources of thin film transistors 1000 and provides multiple data voltages 1020. The first timing controller 11 and the second timing controller 12 are coupled electrically to and control the source driver 102. The control module 13 coupled electrically to the gate driver 101, the first timing controller 11 and the second timing controller 12. While receiving multiple frames 2, the control module 13 controls the gate driver 101 according to the refresh frequency of the frames 2, to input the gate voltage 1010 to the gates of film transistors 1000, to turn on film transistors 1000 sequentially. The control module 13 further controls the first timing controller 11 according to the frame clock 110 to input the frames 2 into pixel units 100, and controls the second timing controller 12 to invert the signal polarity of frames 2 according to the inversion clock 120.

The refresh frequency used in conventional liquid crystal displayer showing image in two-dimensional mode us 60 Hz. Preferably, the first predefined refresh frequency is 60 Hz, and the second predefined refresh frequency is 120 Hz. Generally, the refresh frequency of the conventional 3D displayer with shutter glasses must exceed 120 Hz for better user experience. The 3D liquid crystal displayer will refresh left-eye image and right-eye image interlacedly, and the user only watches the left-eye image through left glass of the shutter glasses, and the right-eye image through the right glass. The 3D liquid crystal displayer is decided to operate in two-dimensional mode or in three-dimensional mode depending on the refresh frequency of frames outputted from a graphic card. The graphic card outputs frames with refresh frequency 60 Hz to enable the 3D liquid crystal displayer showing frames in two-dimensional mode; in the other hand, to enable the 3D liquid crystal displayer showing frames in three-dimensional mode, the graphic card outputs frames with refresh frequency 120 Hz.

While receiving the frames 2, the control module 13 determines whether the refresh frequency of the received frames 2 is substantially similar with the first predefined frequency 20, such as 60 Hz, or the second predefined frequency 21, such as 120 Hz. If the refresh frequency of the received frames 2 is determined to be similar with the first predefined frequency 20, it indicates that these frames should be shown in two-dimensional mode, the control module 13 controls the first timing controller 11 to input the data voltage 1020 corresponding to the frames 2 into pixel units 100 according to the frame clock 110, and controls the second timing controller 12 to set the period of the frame clock 110 as the period of the inversion clock 120 and invert the signal polarity of data voltage 1020 according to the inversion clock 120. In meantime, each frame corresponds to different signal sign, and it indicates that positive portion and negative portion of period of data voltage 1020 respectively comprise only one frame.

Figure 4:
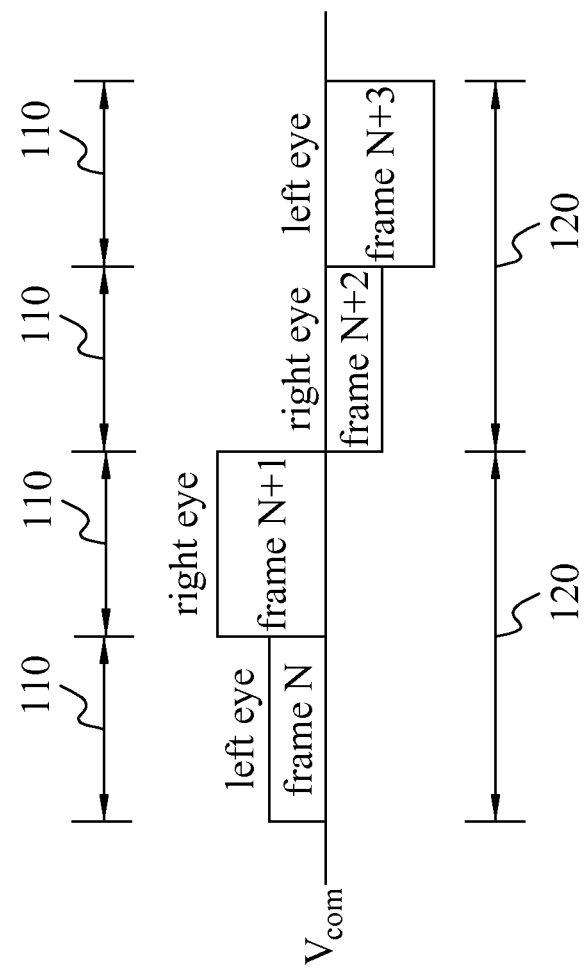
FIG. 4 illustrates a charge/discharge curve of data voltage of first embodiment of liquid crystal displayer in accordance with the present invention.

If the refresh frequency of the received frames 2 is determined to be similar with the second predefined frequency 20, it indicates that these frames should be shown in three-dimensional mode, the control module 13 controls the first timing controller 11 to input the data voltage 1020 corresponding to the frames 2 into pixel units 100 according to the frame clock 110, and controls the second timing controller 12 to set the N times of period of the frame clock 110 as the period of the inversion clock 120 and invert the signal polarity of data voltage 1020 according to the inversion clock 120, N is a positive integer larger than 1. FIG. 4 illustrates a charge/discharge curve of data voltage of first embodiment of liquid crystal displayer in accordance with the present invention. In FIG. 4, the signal polarity of the data voltage 1020 change for every two frames, it indicates that each positive portion and each negative portion of period of data voltage 1020 respectively comprise two frames in three-dimensional mode.

Figure 5:
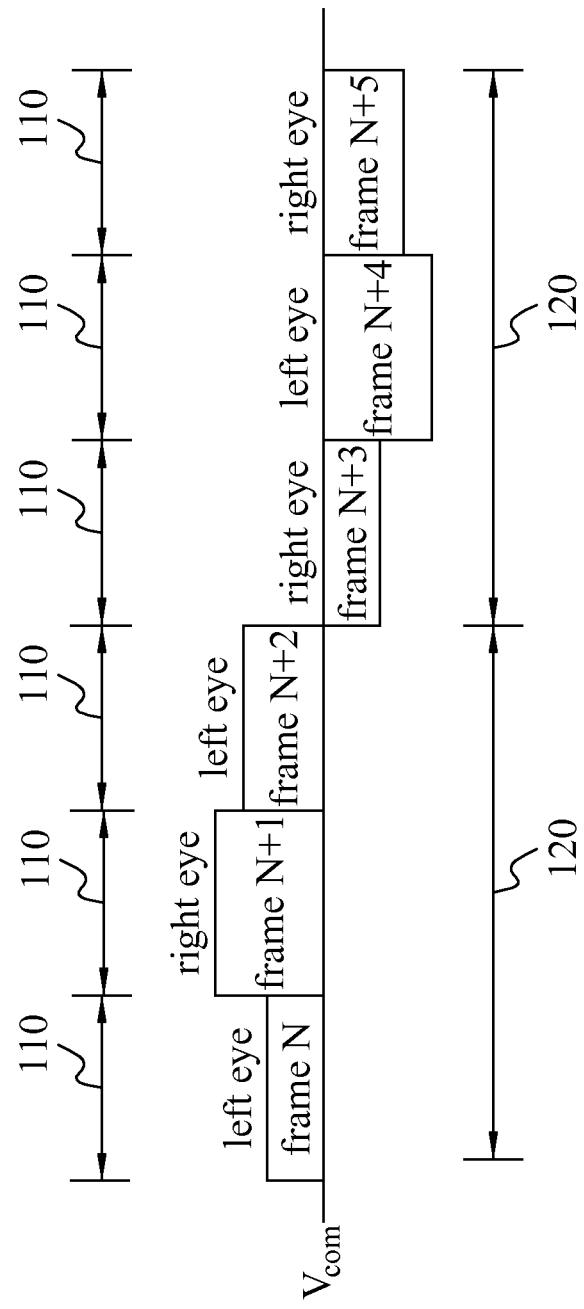
FIG. 5 illustrates a charge/discharge curve of data voltage of second embodiment of liquid crystal displayer in accordance with the present invention.

FIG. 5 illustrates a charge/discharge curve of data voltage of second embodiment of liquid crystal displayer in accordance with the present invention. The difference between first embodiment and second embodiment is that, the signal polarity of the data voltage 1020 change for every three frames in second embodiment, each positive portion and each negative portion of period of data voltage 1020 respectively comprise three frames in three-dimensional mode. Therefore, sum of the data voltage in positive portion of period of the data voltage 1020 is substantially equal to the sum of the data voltage in negative portion, and the residual DC voltage can be removed, it prevents effect of the motion blur and glitter after the displayer is switched from the three-dimensional mode to the two-dimensional mode.

Figure 6:
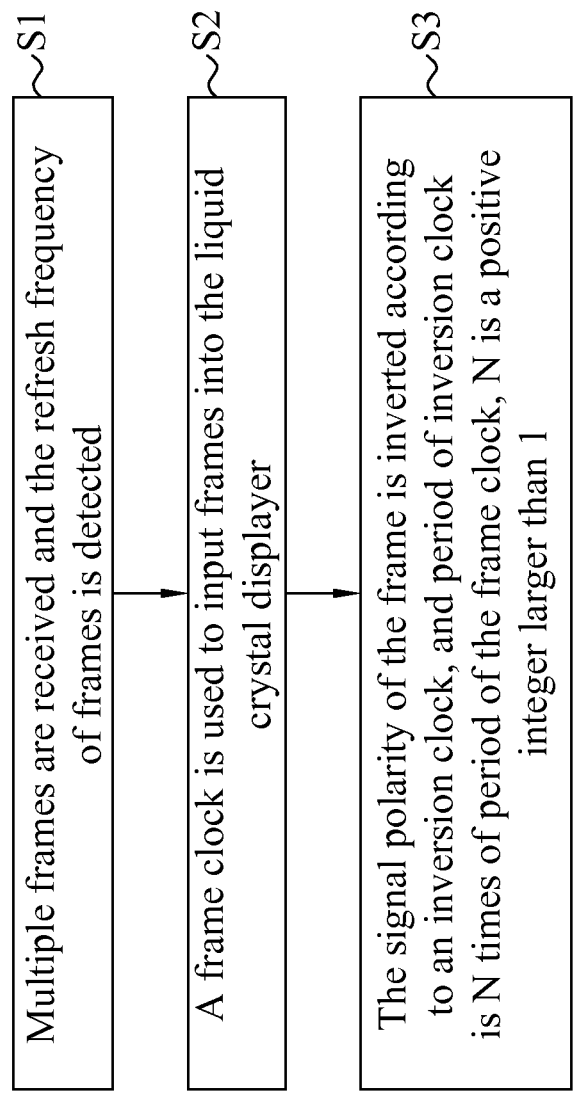
FIG. 6 illustrates a flow chart of the liquid crystal displayer control method in accordance with the present invention.

FIG. 6 illustrates a flow chart of the liquid crystal displayer control method in accordance with the present invention. The liquid crystal displayer control method comprises the following steps. In step S1, multiple frames are received and the refresh frequency of frames is detected. In step S2, a frame clock is used to input frames into the liquid crystal displayer. In step S3, the signal polarity of the frame is inverted according to an inversion clock, and period of inversion clock is N times of period of the frame clock, N is a positive integer larger than 1.

Thus, specific embodiments and applications of a liquid crystal displayer and control method thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims,. all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A liquid crystal displayer capable of displaying image in a three dimensional mode, comprising:
    a display panel, displaying said image;
    a first timing controller electrically coupled to said display panel;
    a second timing controller electrically coupled to said display panel;
    a control module receiving multiple frames and controlling said first timing controller according to a refresh frequency of said frames, to input said frames to said panel based on a frame clock, and controlling said second timing controller to invert the signal polarity of said frames based on an inversion clock;
    wherein when said control module determines that said refresh frequency is substantially equal to a first predefined refresh frequency, said control module controls said second timing controller to set the period of said refresh frequency as the period of said inversion clock, and invert said signal polarity of said frame based on said inversion clock; wherein said display panel displays said frames having first predefined refresh frequency in a two dimensional mode;
    wherein when said control module determines that said refresh frequency is substantially equal to a second predefined refresh frequency, said control module controls said second timing controller to set the N times of period of said refresh frequency as the period of said inversion clock, and invert said signal polarity of said frame based on said inversion clock; wherein said display panel displays said frames having second predefined refresh frequency in a three dimensional mode for a shutter glass; wherein said first predefined refresh frequency is lower than said second predefined refresh frequency.

2. The liquid crystal displayer of claim 1, wherein said frames with said second predefined refresh frequency comprise left-eye images and right-eye images, and said left-eye images and said right-eye images are inputted into said panel interlacedly.

3. A liquid crystal displayer capable of displaying an image in a two dimensional mode; or in a three dimensional mode for a shutter glass, said liquid crystal displayer comprising:
    multiple pixel units, each of said pixel units comprising a thin film transistor, a first capacitor and a second capacitor which are connected in parallel with a drain of said thin film transistor;
    a gate driver coupled electrically to said drains of said thin film transistors, and providing multiple gate voltages;
    a source driver coupled electrically to said sources of said thin film transistors, and providing multiple data voltages;
    a first timing controller coupled electrically to said source driver;
    a second timing controller coupled electrically to said source driver
    a control module coupled electrically to said gate driver, said first timing controller and said second timing controller, wherein while receiving multiple frames, according to a refresh frequency of said frames said control module controls said gate driver to input said gate voltages and controls said first timing controller to input said data voltages which correspond to said frames, to said pixel units according to a frame clock; wherein said control module controls said second timing controller to invert the signal polarity of said frames based on an inversion clock;
    wherein when said control module determines that said refresh frequency is substantially equal to a first predefined refresh frequency, said control module controls said second timing controller to set the period of said refresh frequency as the period of said inversion clock, and invert said signal polarity of said frame based on said inversion clock; wherein said display panel displays said frames having first predefined refresh frequency in a two dimensional mode, when said control module determines that said refresh frequency is substantially equal to a second predefined refresh frequency, said control module controls said second timing controller to set the N times of period of said refresh frequency as the period of said inversion clock, and invert said signal polarity of said frame based on said inversion clock; wherein said display panel displays said frames having second predefined refresh frequency in a three dimensional mode for a shutter glass; wherein said first predefined refresh frequency is lower than said second predefined refresh frequency.

4. The liquid crystal displayer of claim 3, wherein said frames with said second predefined refresh frequency comprise left-eye images and right-eye images, and said left-eye images and said right-eye images are inputted into said panel interlacedly.

5. A liquid crystal displayer control method for controlling a liquid crystal displayer to display an image in two-dimensional mode, or in a three-dimensional mode for a shutter glass, comprising:
    receiving multiple frames and detecting a refresh frequency of said frames;
    inputting said frames into said displayer according to a frame clock; and
    inverting the signal polarity of said frames according to an inversion clock;
    setting the period of said refresh frequency as the period of said inversion clock when said refresh frequency is substantially equal to a first predefined refresh frequency;
    inverting said signal polarity of said frame based on said inversion clock; wherein said displayer displays said frames having first predefined refresh frequency in a two dimensional mode;
    setting the N times of period of said refresh frequency as the period of said inversion clock when said refresh frequency is substantially equal to a second predefined refresh frequency; and inverting said signal polarity of said frame based on said inversion clock; wherein said display panel displays said frames having second predefined refresh frequency in a three dimensional mode for said shutter glass, wherein said first predefined refresh frequency is lower than said second predefined refresh frequency.

6. The liquid crystal displayer control method of claim 5, wherein said frames with said second predefined refresh frequency comprise left-eye images and right-eye images, and said left-eye images and said right-eye images are inputted into said panel interlacedly.

\* \* \* \* \*